(12) United States Patent
Gardner et al.

(10) Patent No.: US 9,449,765 B2
(45) Date of Patent: Sep. 20, 2016

(54) ENERGY STORAGE DEVICE, METHOD OF MANUFACTURING SAME, AND MOBILE ELECTRONIC DEVICE CONTAINING SAME

(75) Inventors: Donald S. Gardner, Los Altos, CA (US); Cary Pint, Hayward, CA (US); Scott B. Clendenning, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 121 days.

(21) Appl. No.: 13/977,564

(22) PCT Filed: Apr. 25, 2012

(86) PCT No.: PCT/US2012/034972
§ 371 (c)(1),
(2), (4) Date: Jul. 29, 2014

(87) PCT Pub. No.: WO2013/162546
PCT Pub. Date: Oct. 31, 2013

(65) Prior Publication Data
US 2014/0335918 A1    Nov. 13, 2014

(51) Int. Cl.
*H01G 11/02*    (2013.01)
*H01G 11/52*    (2013.01)
(Continued)

(52) U.S. Cl.
CPC ............. *H01G 11/52* (2013.01); *G06F 1/1635* (2013.01); *H01G 11/02* (2013.01); *H01G 11/26* (2013.01); *H01G 11/30* (2013.01); *H01G 11/84* (2013.01); *H04M 1/0262* (2013.01); *H01G 9/04* (2013.01);
(Continued)

(58) Field of Classification Search
CPC ........ H01G 9/042; H01G 9/048; H01G 9/22; H01G 11/02; H01G 11/24
See application file for complete search history.

(56) References Cited

U.S. PATENT DOCUMENTS

2005/0219800 A1*  10/2005  Happ .................... H01G 9/025
361/523
2007/0076349 A1   4/2007  Dementiev et al.
(Continued)

FOREIGN PATENT DOCUMENTS

KR    10-2007-0069281 A    7/2007
KR    10-2008-0018702 A    2/2008
(Continued)

OTHER PUBLICATIONS

International Preliminary Report on Patentability received for PCT Patent Application No. PCT/US2012/034972, mailed on Nov. 6, 2014, 10 pages.
(Continued)

*Primary Examiner* — Dion R Ferguson
(74) *Attorney, Agent, or Firm* — Kenneth A. Nelson

(57) ABSTRACT

An energy storage device comprises a first porous semiconducting structure (510) comprising a first plurality of channels (511) that contain a first electrolyte (514) and a second porous semiconducting structure (520) comprising a second plurality of channels (521) that contain a second electrolyte (524). In one embodiment, the energy storage device further comprises a film (535) on at least one of the first and second porous semiconducting structures, the film comprising a material capable of exhibiting reversible electron transfer reactions. In another embodiment, at least one of the first and second electrolytes contains a plurality of metal ions. In another embodiment, the first and second electrolytes, taken together, comprise a redox system.

26 Claims, 5 Drawing Sheets

(51) Int. Cl.
  H01G 11/26   (2013.01)
  H01G 11/30   (2013.01)
  G06F 1/16    (2006.01)
  H01G 11/84   (2013.01)
  H04M 1/02    (2006.01)
  H01G 9/04    (2006.01)
  H01G 11/46   (2013.01)

(52) U.S. Cl.
  CPC ...... H01G 11/46 (2013.01); H04M 2001/0204 (2013.01); Y02E 60/13 (2013.01); Y10T 29/49115 (2015.01)

(56) References Cited

U.S. PATENT DOCUMENTS

| | | |
|---|---|---|
| 2010/0008021 A1 | 1/2010 | Hu et al. |
| 2011/0242730 A1 | 10/2011 | Zhou et al. |
| 2012/0008253 A1 | 1/2012 | Kuroda et al. |
| 2013/0189592 A1* | 7/2013 | Roumi .................. H01G 9/048 429/406 |

FOREIGN PATENT DOCUMENTS

| | | |
|---|---|---|
| WO | 2011/123135 A1 | 10/2011 |
| WO | 2013/162546 A1 | 10/2013 |

OTHER PUBLICATIONS

Office Action Received for Taiwanese Patent Application No. 102113794, mailed on Aug. 11, 2014, 10 Pages of Taiwanese Office Action and 6 Pages of English Translation.

Office Action Received for Taiwanese Patent Application No. 102113794, mailed on Jun. 15, 2015, 3 Pages of Taiwanese Office Action and 4 Pages of English Translation.

International Search Report and Written Opinion received for PCT Patent Application No. PCT/US2012/034972, mailed on Dec. 27, 2012, 12 pages.

International Search Report and Written Opinion received for PCT Patent Application No. PCT/US2010/029821, mailed on Dec. 31, 2010, 9 pages.

International Preliminary Report on Patentability received for PCT Patent Application No. PCT/US2010/029821, mailed on Oct. 11, 2012, 7 pages.

* cited by examiner

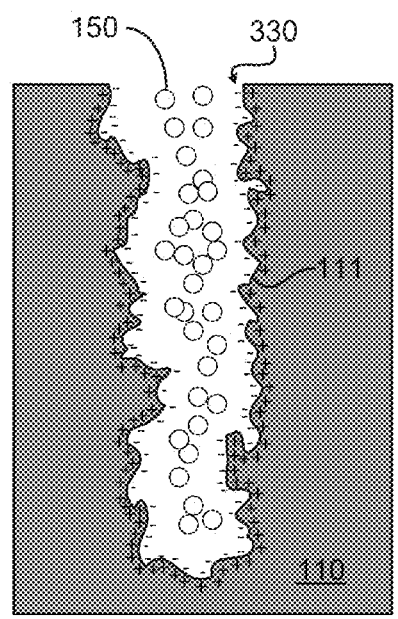
FIG. 3
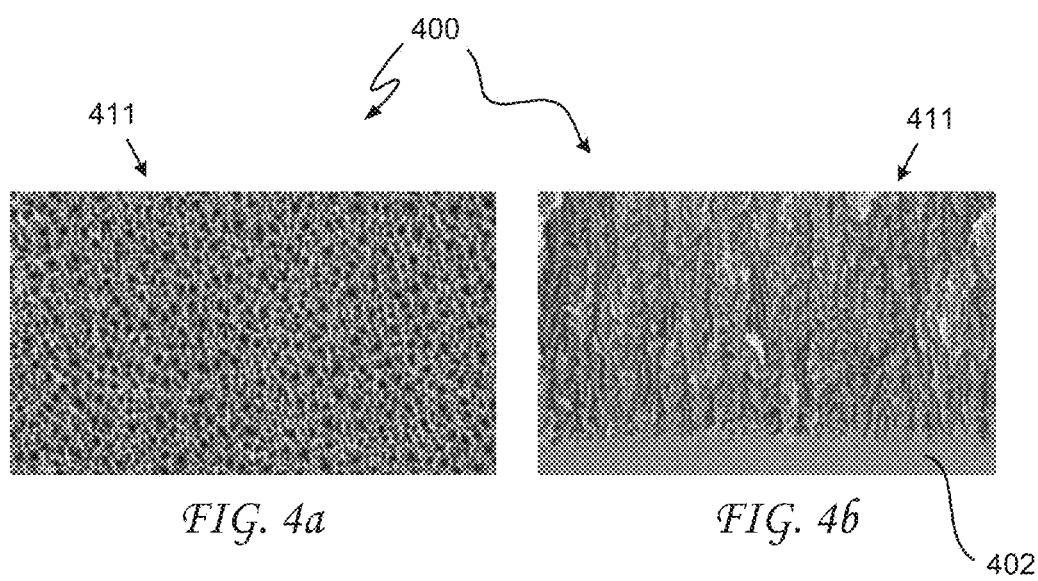
FIG. 4a
FIG. 4b

ENERGY STORAGE DEVICE, METHOD OF MANUFACTURING SAME, AND MOBILE ELECTRONIC DEVICE CONTAINING SAME

CROSS REFERENCE TO RELATED APPLICATION

This application is related to International Application No. PCT/US2010/029821, which has been published as WO 2011/123135, filed on Apr. 2, 2010 and assigned to the same assignee to which the present application is assigned.

FIELD OF THE INVENTION

The disclosed embodiments of the invention relate generally to energy storage, and relate more particularly to electrochemical capacitive energy storage devices.

BACKGROUND OF THE INVENTION

Modern societies depend on the ready availability of energy. As the demand for energy increases, devices capable of efficiently storing energy become increasingly important. As a result, energy storage devices, including batteries, capacitors, electrochemical capacitors (ECs), (including pseudocapacitors and electric double-layer capacitors (EDLCs) (sometimes called ultracapacitors, among other names)), hybrid ECs, and the like are being extensively used in the electronics realm and beyond. In particular, capacitors are widely used for applications ranging from electrical circuitry and power delivery to voltage regulation and battery replacement. Electrochemical capacitors are characterized by high energy storage capacity, rapid charge/discharge ability, and large cycle lifetimes, as well as other desirable characteristics including high power density, small size, and low weight, and have thus become promising candidates for use in several energy storage applications.

The related case mentioned above (International Application No. PCT/US2010/029821) discloses three-dimensional structures for forming high energy density electrochemical capacitors using, for example, porous silicon. In some of the embodiments disclosed there, an electrochemical process was used to etch pores deep into a silicon structure and the pores were filled with an electrolyte or with a high-k dielectric material and/or a thin conductive film in combination with an electrolyte.

BRIEF DESCRIPTION OF THE DRAWINGS

The disclosed embodiments will be better understood from a reading of the following detailed description, taken in conjunction with the accompanying figures in the drawings in which:

FIG. 3 is a depiction of an electric double layer formed within a channel of a porous structure according to an embodiment of the invention;

FIGS. 4a and 4b are images of, respectively, a surface and a cross-sectional slice of a porous silicon structure;

Figure 1:
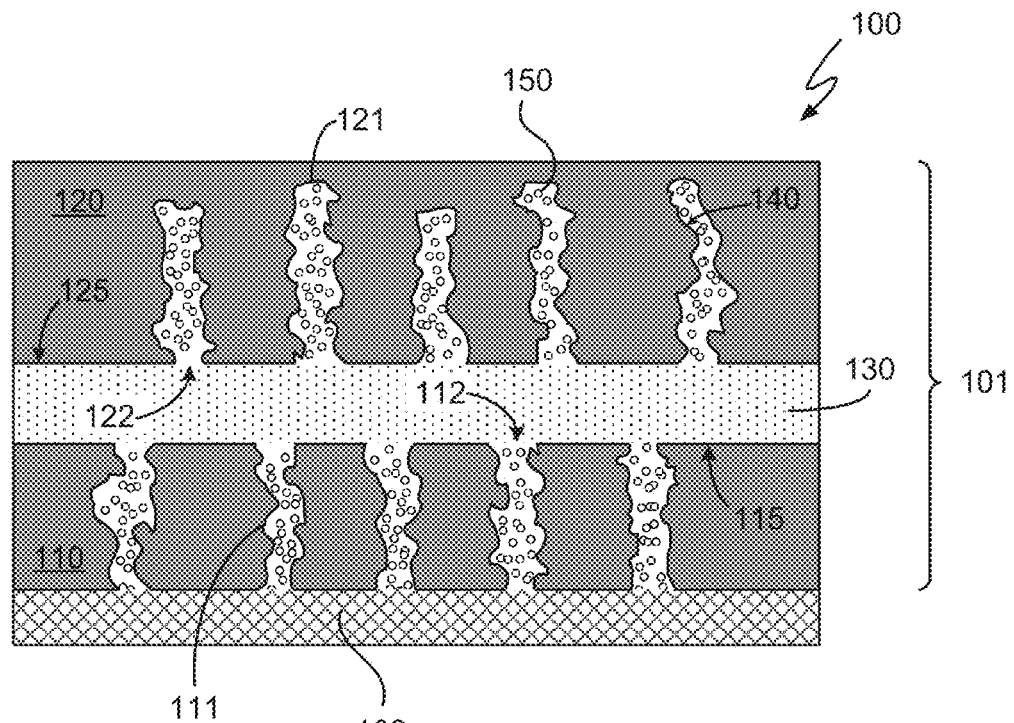
FIGS. 1 and 2 are cross-sectional views of an energy storage structure according to embodiments of the invention.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions unless otherwise indicated either specifically or by context. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "in one embodiment" herein do not necessarily all refer to the same embodiment.

DETAILED DESCRIPTION OF THE DRAWINGS

In various embodiments of the invention, an energy storage device comprises a first porous semiconducting structure comprising a first plurality of channels that contain a first electrolyte and a second porous semiconducting structure comprising a second plurality of channels that contain a second electrolyte. In one embodiment, the energy storage device further comprises a film on at least one of the first and second porous semiconducting structures, the film comprising a material capable of exhibiting reversible electron transfer reactions. In another embodiment, at least one of the first and second electrolytes contains a plurality of metal ions. In another embodiment, the first and second electrolytes, taken together, comprise a redox system.

Although much of the discussion herein will focus on electrochemical capacitors, the "energy storage device" designation explicitly includes—in addition to ECs—hybrid electrochemical capacitors (which, like electrochemical capacitors, are discussed in more detail below) as well as batteries, fuel cells, and similar devices that store energy. Energy storage devices according to embodiments of the invention can be used for a wide variety of applications, including in personal computers (PCs), including desktop and laptop (notebook) computers, tablet computers, cell phones, smart phones, music players, servers, other electronic devices, automobiles, buses, trains, airplanes, other transportation vehicles, home energy storage, storage for energy generated by solar or wind energy generators—especially energy harvesting devices—and many others.

Electrochemical capacitors operate according to principles similar to those that govern conventional parallel plate capacitors, but certain important differences do apply. One significant difference concerns the charge separation mechanism. For one important class of ECs this typically takes the form of a so-called electric double layer, or EDL, rather than the dielectric of a conventional capacitor. The EDL is created at an interface between an electrolyte and a high-surface area electrode by the electrochemical behavior of electrons (or holes) on one side of the interface and ionic charge carriers on the other side, and results in an effective separation of charge in spite of the fact that the two layers within the double layer are so close together. (Physical separation distances are on the order of a single nanometer.) Thus, a typical EDL capacitor may be thought of as storing charge in its EDL. Each layer of the EDL, which is formed when a voltage is applied across the interface, is electrically conductive but the properties of the double layer prevent current from flowing across the boundary between them. (The EDL is further discussed below in connection with FIG. 3.)

As is true in conventional capacitors, capacitance in an EDL capacitor is proportional to the surface area of the electrodes and inversely proportional to the charge separation distance. The very high capacitances achievable in an EDL capacitor are due in part to the very high surface area attributable to the multi-channel porous structure and to the nanometer-scale charge separation distance attributable to the EDL, which arises due to the presence of an electrolyte, as explained above. One type of electrolyte that may be used in accordance with embodiments of the invention is an ionic liquid. Another is an electrolyte (e.g., Li2SO4, LiPF6) comprising an ion-containing solvent. Organic electrolytes, aqueous electrolytes, and solid-state electrolytes are also possible.

Another class of electrochemical capacitor is the pseudocapacitor, where, in addition to EDL capacitance a different storage mechanism—one that is Faradaic and not electrostatic in origin—can arise at the surface of certain types of electrodes. This is typically referred to as "pseudocapacitance," and is characterized by a charge storage process that is similar to the operation of many solid-electrode batteries. Typically, one of the electrodes of a pseudocapacitor is coated with a transition metal oxide, a suitable conducting polymer, or a similar material that makes up the active material where charge is stored. These materials can be used with an electrolyte such as a potassium hydroxide (KOH) solution; when the device is charged, the electrolyte will react with the material and drive a charge transfer reaction where energy is stored. More specifically, these materials store most of their energy through highly-reversible surface and near-surface electron transfer (e.g., redox (Faradaic)) reactions, which enable higher power than bulk storage in conventional batteries due to the fast charge and discharge kinetics.

Hybrid electrochemical capacitors are energy storage devices that combine the attributes of ECs and batteries. In one example, an electrode coated with a lithium ion material is combined with an electrochemical capacitor in order to create a device that has an EC's rapid charge and discharge characteristics and a battery's high energy density. On the other hand, hybrid ECs, like batteries, have shorter expected lifespans than do electrochemical capacitors.

Figure 2:
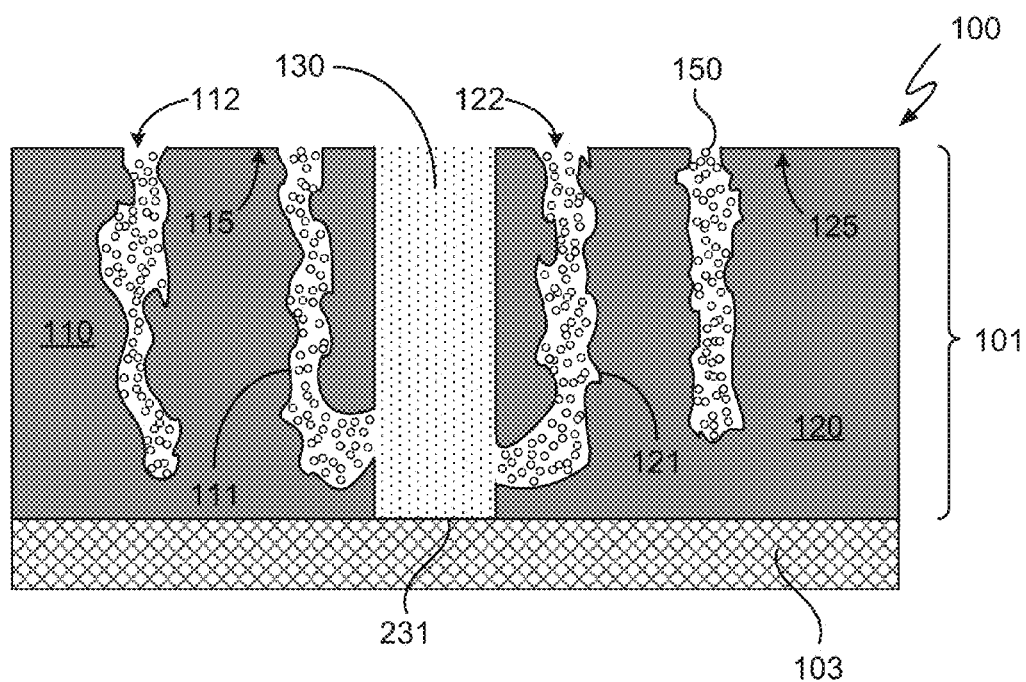

Referring now to the drawings, FIGS. 1 and 2 are cross-sectional views of an energy storage structure 100 that will be used to guide an initial discussion introducing concepts and structures that will aid in the understanding of embodiments of the present invention. As illustrated in FIG. 1, energy storage structure 100 comprises an energy storage device 101 and a conductive support structure 102. (In some embodiments support structure 102 can be omitted.) Alternatively, as illustrated in FIG. 2, energy storage structure 100 comprises energy storage device 101 and a non-conductive support structure 103.

Energy storage device 101 comprises an electrically conductive structure 110 and an electrically conductive structure 120 separated from each other by a separator 130 that is an electron insulator and an ionic conductor. Separator 130 prevents electrically conductive structures 110 and 120 from physically contacting each other, thereby preventing an electrical short circuit. (In other embodiments, for reasons discussed below, a separator is not necessary and can be omitted.)

In some embodiments, at least one of electrically conductive structures 110 and 120 comprises a porous structure containing multiple channels, each one of which has an opening to a surface of the porous structure. This feature is a result of a process, described below, used to form the porous structure. As an example, the porous structure may be formed within a conductive or a semiconductive material. Alternatively, the porous structure may be formed within an insulating material (e.g., alumina) that has been coated with an electrically conductive film (e.g., an atomic layer deposition (ALD) conductive film such as titanium nitride (TiN), tungsten, or ruthenium). In this regard, materials having greater electrical conductivity are advantageous because they lower the energy storage device's effective series resistance (ESR). In the illustrated embodiments, both electrically conductive structure 110 and electrically conductive structure 120 comprise such a porous structure. Accordingly, electrically conductive structure 110 comprises channels 111 with openings 112 to a surface 115 of the corresponding porous structure and electrically conductive structure 120 comprises channels 121 with openings 122 to a surface 125 of the corresponding porous structure.

Various configurations of energy storage device 101 are possible. In the embodiment of FIG. 1, for example, energy storage device 101 comprises two distinct porous structures (that is, electrically conductive structure 110 and electrically conductive structure 120) that have been bonded together face-to-face with separator 130 in between. As another example, in the embodiment of FIG. 2 energy storage device 101 comprises a single planar porous structure in which a first section (electrically conductive structure 110) is separated from a second section (electrically conductive structure 120) by a trench 231 containing separator 130. One of the electrically conductive structures will be the positive side and the other electrically conductive structure will be the negative side. Trench 231 may separate electrically conductive structure 110 and 120 along a straight line, but alternatively may separate them using a more complex shape such as the meandering space between the fingers of two interdigitated electrodes.

As an example, separator 130 could be a permeable membrane or other porous polymer separator. In general, the separator prevents the physical contact of anode and cathode (which could cause an electrical malfunction in the device) while permitting the transfer of ionic charge carriers. In addition to polymer separators, several other separator types are possible. These include non-woven fiber sheets or other non-woven separators, liquid membranes, polymer electrolytes, solid ion conductors, glass fiber, paper, ceramic, and the like. In some embodiments, non-woven separators are concentrations of fibers that are either randomly oriented or are arranged in a directional pattern.

It should be noted that the separator, although shown in FIG. 2, may not be necessary in the configuration illustrated there because, for example, support structure 102 could be used to maintain a physical separation between structures 110 and 120. As another example, electrically conductive structures 110 and 120 could each be attached to a ceramic package (not shown) that would keep the two electrically conductive structures physically separate from each other.

As an example, the porous structure of electrically conductive structures 110 and 120 can be created by a wet etch process in which a liquid etchant applied to a surface of the electrically conductive structures etches away portions of the electrically conductive structure in a way that is at least somewhat similar to the way water is able to carve channels in rock. This is why each one of the channels has an opening to the surface of the electrically conductive structure; the wet etch method is incapable of creating fully-enclosed cavities, i.e., cavities with no opening to the surface, like an air bubble trapped inside a rock, within the porous structure. This is not to say that those openings cannot be covered with other materials or otherwise closed up because of the presence of or addition of other materials—that is in fact likely to occur in several embodiments—but, whether covered or not, the described openings to the surface are a feature of each channel in each porous structure according to at least one embodiment of the invention. (One embodiment in which the openings may be covered up is one in which a layer of epitaxial silicon as a location for circuitry or other wiring is grown on top of the channels).

With the right etchant, it should be possible to make porous structures having the described characteristics from a wide variety of materials. Silicon in various forms—including metallurgical grade silicon, monocrystalline silicon, polycrystalline silicon, and silicon on insulator—is one material that works well. As an example, a porous silicon structure may be created by etching a silicon substrate with a mixture of hydrofluoric acid (HF) and ethanol or isopropyl alcohol. More generally, porous silicon and other porous structures may be formed by such processes as anodization and stain etching. Etching techniques according to embodiments of the invention will be discussed in more detail below.

Besides porous silicon, which has already been mentioned, some other materials that may be especially well-suited for energy storage devices according to embodiments of the invention are porous germanium and porous tin. Possible advantages of using porous silicon include its compatibility with existing silicon technology and its abundance in the earth's crust. Porous germanium enjoys a similar advantage as a result of existing technology for that material and, as compared to silicon, enjoys the further possible advantage that its native oxide (germanium oxide) is water-soluble and so is easily removed. (The native oxide that forms on the surface of silicon may trap charge, which is an undesirable result.) Porous germanium is also highly compatible with silicon technology. Possible advantages of using porous tin, which is a zero-band-gap material, include its enhanced conductivity with respect to certain other conductive and semiconductive materials.

Other materials may also be used for the porous structure, including semiconducting materials such as gallium arsenide (GaAs), indium phosphide (InP), boron nitride (BN), silicon carbide (SiC), and alloys such as an alloy of silicon and germanium. Organic semiconductors may also be used. In some embodiments the semiconducting materials—or even insulating materials—may be treated to make them electrically conductive (or more highly conductive). An example is silicon that is degenerately doped with boron. In addition to porous semiconducting substrates, porous conducting substrates may also be used for ECs, including, in certain embodiments, substrates composed of carbon or of metals such as copper, aluminum, nickel, calcium, tungsten, molybdenum, and manganese.

The etching used to make the porous structures may be accomplished using an electrochemical etch that makes use of a dilute mixture of HF and isopropyl alcohol (or ethanol or the like) to form nanometer pores that can extend through a significant portion of the substrate. As an example, a porous structure such as porous semiconducting structure 510 may be prepared by applying an electrochemical etch technique to a solid silicon wafer having an initial resistivity of 0.7 milli-ohm centimeters (mf-cm) using as the etchant one of the HF mixtures referred to above. A current density in a range of approximately 25 milliamps per square centimeter (mA/cm2) to 500 mA/cm2 may be used. (The area component in these values refers to an area of the substrate surface before formation of the pores.)

The foregoing discussion has made reference to porous structures according to embodiments of the invention. These porous structures, as mentioned, can be formed within a variety of materials, including silicon (in various forms, including metallurgical grade silicon, monocrystalline silicon, polycrystalline silicon, and silicon on insulator), germanium, GaAs, InP, BN, CdTe, tin, copper, aluminum, nickel, calcium, tungsten, molybdenum, manganese, silicon carbide, organic semiconductors, and silicon-germanium alloys. The material from which the porous structure is made can, in at least some embodiments, be doped with elements that increase its conductivity; this may be done using standard techniques that are known in the art. In one embodiment, the material in which the porous structure is formed is silicon and the dopant species is boron, which may be introduced into the silicon in a concentration of, for example, 1019 atoms/cm3. Other possible dopants include phosphorus and arsenic (though these and other n-type dopants require an illumination process during etching that p-type dopants do not).

Embodiments of the invention that rely on electrochemical etching as the channel creation technique have another reason for introducing dopants into the material from which the porous structure is to be made. Where silicon and an HF etchant are involved, it is thought that a high electric field attracts holes at defects and at the tip of the pores that aid the reaction between the silicon and the fluorine from the etchant. It is thought that the process involves the formation of SiF4 molecules in liquid form. The SiF4 gets pulled away and eventually gets washed out of the channels, leaving hydrogen atoms that bond to the sidewalls and also form H2 that then bubbles away as a gas. Some hydrogen atoms remain; these bond with remaining silicon atoms. This process etches the channel (anisotropically) downward as opposed to expanding laterally in an isotropic manner (which would simply polish the surface without forming channels). Additional details, as best understood, are set forth below (though it must be said that precise details of the mechanism of porous silicon formation remain at least somewhat unclear).

In general terms, during channel formation, direct dissolution of the semiconductor almost always competes with oxidation plus subsequent dissolution of the oxide. The etchant (e.g., HF), therefore, has to be able to dissolve the oxide. A second prerequisite for the dissolution reaction and thereby channel formation in a semiconductor is the availability of electronic holes. The silicon surface, in contact with aqueous HF solutions, becomes saturated by hydrogen, depleted of electronic holes, and tends to be chemically inactive with respect to the electrolyte (this protects the channel sidewalls during the etching process). If a voltage is applied to the electrodes, the holes present in a silicon wafer start migrating towards the silicon-electrolyte interface. At the interface, a hole removes one silicon bond and thereby makes one silicon atom more susceptible for interactions with the electrolyte. Eventually, the silicon atom is transferred into the solution. The electrode decomposes into areas with optimal current density and channels are formed in areas with almost no current density. According to different models, initiation of the channel growth could begin at micro-cavities, structural defects, mechanically strained areas, or local perturbation of the surface potential field.

Referring again to FIGS. 1 and 2, energy storage structure 100 further comprises (in the embodiment illustrated in FIG. 1) an electrically conductive coating 140 on at least a portion of the porous structure and in at least some of channels 111 and/or channels 121. Such an electrically conductive coating may be necessary in order to maintain or enhance the conductivity of the porous structure, which can also lower the ESR, thereby improving performance. For example, a device having lower ESR is able to deliver higher power (which may be manifested in terms of greater acceleration, more horse power, etc.). In contrast, higher ESR (a condition that often prevails inside a typical battery) limits the amount of available energy, at least partially due to the fact that much of the energy is wasted as heat, which is a key consideration for both long-term performance and safety.

Illustrated in FIGS. 1 and 2 is an electrolyte 150, which gives rise to the EDL, as explained above. Electrolyte 150 (as well as the other electrolytes described herein) is represented in the drawings using a random arrangement of circles. This representation is intended to convey the idea that the electrolyte is a substance (liquid or solid, including gel-like materials) containing free ionic charge carriers. The circles were chosen for convenience and are not intended to imply any limitation as to the electrolyte components or qualities, including any limitation with respect to the size, shape, or number of the ionic charge carriers.

After the introduction of electrolyte 150, an electric double layer is formed within the channels of the porous structure, as depicted schematically in FIG. 3. In that figure, an electric double layer 330 has been formed within one of channels 111. EDL 330 is made up of two components: the electrical charge of the sidewalls of channel 111 (depicted as being positive in FIG. 3 but which in other embodiments could be negative); and the free ionic charge carriers in the electrolyte. EDL 330 thus provides a separation of charge that is necessary in order for the capacitor to function. As explained earlier, the large capacitance, and, hence, energy storage potential, of EDL capacitors arises in part due to the small (approximately 1 nanometer (nm)) separation distance between electrolyte ionic charge carriers and the electrode surface charge.

It should be noted that the FIG. 1 and FIG. 2 depictions of the porous structures are highly idealized in that, to mention just one example, all of channels 111 and 121 are shown as only extending vertically. In reality the channels may branch off in multiple directions to create a tangled, disordered pattern that may look something like the porous structure shown in FIGS. 4a and 4b.

FIGS. 4a and 4b are scanning electron microscope (SEM) images of, respectively, a surface and a cross-sectional slice of a porous structure 400 (in this case porous silicon). As illustrated, porous structure 400 contains multiple channels 411. It should be understood that channels 411 are likely to twist and turn along their lengths such that a single channel may have both vertical and horizontal portions as well as portions that are neither completely vertical nor completely horizontal but fall somewhere in between. Note that in FIG. 4b, the channels extend near to but do not quite reach a bottom of the etched structure, thus leaving a layer 402 of un-etched silicon underneath the channels. In one embodiment, un-etched layer 402 acts as a support structure for porous structure 400 (and for the corresponding energy storage device, not shown), and is thus the equivalent of support structure 102.

As was mentioned above, the energy storage mechanism for EDLCs is generally due to the formation of a charge double-layer at the electrode/electrolyte interface when a voltage is applied to the system. Embodiments of the invention seek to improve energy storage capability even beyond what an EDLC can offer by beginning with an EDLC framework (e.g., using porous silicon or another porous semiconducting material as described herein) and building onto this framework advanced functionality that enables substantially greater energy storage capability. Other advantages are also possible. For example, the enhanced energy storage comes with high achievable power density as compared to batteries and the like, such that electrochemical capacitors are capable of providing high power for applications such as (to take one example) turbo modes in microprocessors.

Embodiments of the invention utilize approaches such as alternative ionic species to enhance the amount of charge that can be stored in the double layer, and/or device architectures that rely on Faradaic reactions for charge storage in either the electrode or electrolyte. As an example, various embodiments combine porous semiconducting structures that are compatible with silicon or other semiconductor process technology with pseudocapacitors or hybrid electrochemical capacitor-battery technology. Some embodiments involve the use of a pseudocapacitive film that coats one or both of the porous electrodes. Others involve the use of an electrolyte containing metal ions that can be exchanged between the surfaces (not the bulk) of two nanostructured electrodes. Other embodiments involve the use of electrolytes that together constitute a redox system such that charge can be stored in the electrolyte solution using reversible redox chemistry. These embodiments, each of which may be used in conjunction with either or both of the others, are described in more detail below.

Figure 5:
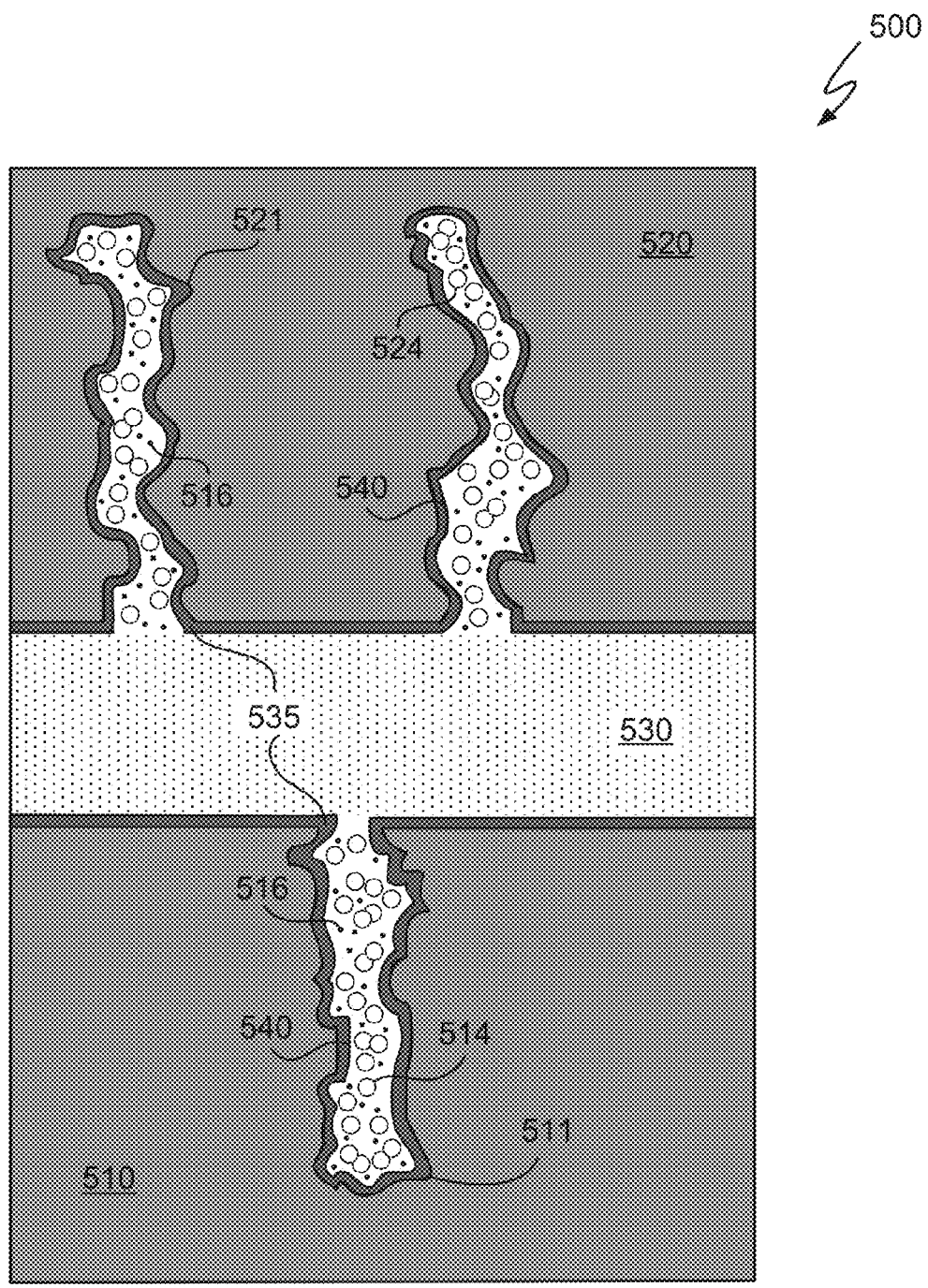
FIG. 5 is a cross-sectional view of a portion of an energy storage device according to an embodiment of the invention.

FIG. 5 is a cross-sectional view of a portion of an energy storage device 500 according to an embodiment of the invention. Energy storage device 500 is similar to, and shares many characteristics with, energy storage structure 100 of FIGS. 1 and 2, but is shown at a larger scale in order to more clearly show certain structural details that will be discussed below.

As illustrated in FIG. 5, energy storage device 500 includes a porous semiconducting structure 510 (equivalent to electrically conductive structure 110 of energy storage structure 100) and a porous semiconducting structure 520 (equivalent to electrically conductive structure 120 of energy storage structure 100) separated by a separator 530 (equivalent to separator 130 of energy storage structure 100). Porous semiconducting structure 510 comprises a plurality of channels 511 (only one of which is shown) that contain an electrolyte 514, and porous semiconducting structure 520 comprises a plurality of channels 521 that contain an electrolyte 524.

One or both of electrolytes 514 and 524 can comprise a non-aqueous electrolyte, which may be advantageous in certain embodiments because non-aqueous electrolytes can go to higher voltages and can thus contribute to an increase in the amount of energy that may be stored by energy storage device 500 (since the energy of a capacitor is proportional to the square of its voltage). Other types of electrolyte, including any of those disclosed above, may also be used.

In some embodiments, at least one of the first and second electrolytes contains a plurality of metal ions, such as ions of lithium (Li+), sodium (Na+), and/or fluorine (F−) or the like (indicated in FIG. 5 by dots 516). This would enable non-Faradaic reactions that store energy on the surface of high surface area architectures. The resulting device may be envisioned as a combination of an EDLC and a metal-ion battery in that the metal ions are captured on the surface (rather than in the bulk) of the material to store the charge. The metal ions migrate to the nanostructured cathode through the electrolyte, entering the pores and reaching the surfaces in the interior of the cathode without having to undergo solid-state intercalation. This enables much higher energy densities and specific energies than is true for EDLCs and also enables very high power densities (based on the ability of the high surface area of the material to accommodate a significant number of metal ions (comparable to the bulk of a flat battery)) and gives the promise for significantly longer lifetimes approaching that of an EDLC (i.e., hundreds of thousands to millions of cycles, assuming optimized device performance) while retaining all the benefits of using porous silicon (or other materials as discussed herein) for the conventional EDLC.

In order to ensure ideal, long-term cycling behavior, the porous electrode could in some embodiments be coated with a passivation barrier (further described below) in order to prevent metal intercalation and/or to protect the semiconductor material from oxidation. In the absence of such a barrier, the electrode could end up being a metal intercalation anode with extremely low solid-state diffusion rates and poor cyclability. Storing lithium or other metal ions in the bulk of a material means that the ions must leave the interior of a cathode and eventually enter the bulk of an anode during recharge, and vice versa during discharge. As further described below, the use of ALD as a technique to treat the electrode surfaces could enable optimization of small metal ion adsorption to maximize the energy density of such a device.

Pseudocapacitance can also originate from redox reactions in the electrolytic solution. Accordingly, in some embodiments electrolytes 514 and 524 are selected such that, taken together, they comprise a redox system, meaning that the electrolytes interact with each other in such a way that electrons can be reversibly exchanged between them (thus allowing energy to be stored within the electrolytes). One example of a redox system involves a first electrolyte (i.e., either 514 or 524) that is an alkali metal iodides aqueous solution and a second electrolyte that is a vanadyl solution.

Electrochemical capacitors can include both electric double layer capacitance and redox (or, more generally, electron transfer) reactions (pseudocapacitance) together as a charge storage mechanism. In order to take advantage of this, energy storage device 500 further comprises a film 535 on at least one of porous semiconducting structures 510 and 520 (in the illustrated embodiment the film is on both) comprising a material capable of exhibiting reversible electron transfer reactions. The presence of such a material makes energy storage device 500 a pseudocapacitor. Film 535 acts to store charge in reversible faradic reactions between different oxidation states of the crystalline deposited material.

As mentioned above, pseudocapacitive materials store energy through highly reversible surface electron transfer reactions. If such materials are placed onto an EDLC, the resulting pseudocapacitor benefits from both types of energy storage—the electric double-layer storage in addition to the electron transfer storage. This combination yields advantages of both types of devices. For example, the highly reversible electrostatic charge storage in EDLCs does not produce the changes in volume that usually accompany the redox reactions of the active masses in batteries, as the charge is stored on the surface. Furthermore, in pseudocapacitors the volume change is small since the active materials are coated in thin crystalline films on high surface-area structures. Such volume changes in bulk electrode systems are the main cause of the limited cycle life of batteries (generally several hundred to a few thousand cycles) due to difficulties in charge transport across cracks that develop to relieve the stress in bulk crystalline films after a moderate number of charge-discharge cycles. The EDLC and pseudocapacitor systems of embodiments of the invention enable expected device cyclability in the hundred thousand to million cycle range.

In some embodiments, the material of film 535 is a conducting polymer such as polypyrrole, polyaniline, polythiophene, or the like. In other embodiments, the material may comprise a nitride, a carbide, an oxide, a silicide, a boride, a borosilicide, a phosphide, a borophosphide, a sulfide, or the like. Nitrides may include nitrides of titanium, vanadium, niobium, tantalum, molybdenum, tungsten, chromium, vanadium-titanium, and titanium-aluminum. Carbides may include carbides of titanium, zirconium, hafnium, vanadium, niobium, tantalum, molybdenum, tungsten and any other conductive metal nitride or carbide, including carbonitrides. Silicides and borosilicides may include silicides or borosilicides of titanium, zirconium, hafnium, nickel, and cobalt. Phosphides and borophosphides may include phosphides or borophosphides of iron, ruthenium, cobalt, and nickel. Oxides may include oxides of ruthenium, lead, iridium, cobalt, manganese, molybdenum, tungsten, nickel, niobium, vanadium, chromium, and carbon/transition metal composites. In each case, the porous semiconducting structures with which film 535 is associated may be formed in silicon or any other suitable material, including any of the semiconducting (or other) materials disclosed herein.

Transition metal nitrides and carbides are promising candidates as electrode materials for electrochemical capacitors due to their high electronic conductivities and electrochemical stability in aqueous electrolytes. Higher capacitance is achieved by a series of reversible redox reactions through hydroxy bonding confined to a few atomic layers of oxide on the surface of an underlying conductive nitride. VN in KOH and Mo2N in H2SO4 show particular promise due to their relatively large stability windows of 1.2V and 0.8V (see Table 1). Vanadium exhibits numerous oxidation states and can be deposited using vanadium amide TDEAV [tetrakis(diethylamido)vanadium] and ammonia as a precursor with ALD. For high aspect ratios, a high vapor pressure precursor such as VCl4 (e.g., with a vapor pressure of 6 torr at 20° C.) would be more preferable with NH3 as a co-reactant.

TABLE 1

| Material | Stability Window (V) | |
|---|---|---|
| | KOH | $H_2SO_4$ |
| VN | 1.2 | Unstable |
| VC | 0.7 | Unstable |
| $Mo_2N$ | Unstable | 0.8 |
| $Mo_2C$ | Unstable | Unstable |
| $W_2N$ | 0.7 | Unstable |
| $W_2C$ | Unstable | 0.7 |

In certain embodiments, film 535 may be on the order of one or two nanometers thick. Any of the materials mentioned above may be deposited using ALD processes, which are capable of depositing at the given thickness scale. Metal silicides could also be prepared by solution "electroless" metal deposition of Ni, Co etc. followed by anneal.

Referring still to FIG. 5, energy storage device 500 may further comprise a passivation barrier 540 that coats semiconducting structures associated with electrolytes that contain metal ions (e.g., either one of or both of porous semiconducting structures 510 and 520) in order to prevent metal intercalation (i.e., the insertion of metal molecules into the molecular structure of electrodes 510 and 520). As an example, barrier 540 may be similar to electrically conductive coating 140 that was introduced above and shown in FIG. 1. In some embodiments, barrier 540 is part of film 535 such that film 535 exhibits a bilayer structure with the pseudocapacitive film as an upper layer and barrier 540 as a lower layer that lies between the pseudocapacitive film and the porous semiconducting structures. In other embodiments, barrier 540 constitutes a separate layer that is distinct from (but still adjacent to) film 535. In various embodiments, barrier 540 can comprise an electrically conducting material such as TiN, ruthenium, tungsten, copper, and the like as well as an electrically insulating material such as a high-k oxide or the like (where "high-k" means a dielectric constant greater than 3.9). Any of the foregoing materials (with the possible exception of copper, which suffers from a lack of high-aspect-ratio ALD processes) may be deposited using ALD. In certain embodiments, a conductive material for barrier 540 may be advantageous because it greatly enhances the collection of electrons involved in the pseudocapacitive material's electron transfer reactions.

Figure 6:
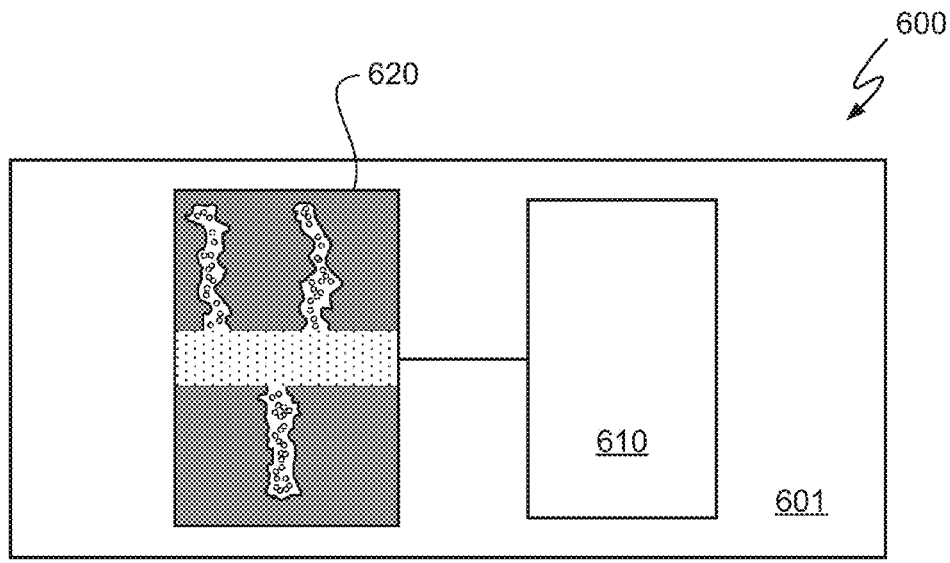
FIG. 6 is a schematic representation of a mobile electronic device according to an embodiment of the invention.

FIG. 6 is a schematic representation of a mobile electronic device 600 according to an embodiment of the invention. As illustrated in FIG. 6, mobile electronic device 600 comprises a housing 601, an integrated circuit (IC) die 610 within the housing, and an energy storage device 620 within housing 601 and associated with IC die 610 so as to be capable of providing energy to the IC die. In some embodiments, being "associated with" IC die 610 means energy storage device 620 is integrated into IC die 610 or its packaging in some fashion (e.g., by being implemented on the die itself; by forming part of a Package-on-Package (PoP) architecture or a system-on-chip (SoC) architecture; etc.)

IC die 610 may comprise any type of integrated circuit device. In one embodiment, the IC die includes a processing system (either single core or multi-core). For example, the IC die may comprise a microprocessor, a graphics processor, a signal processor, a network processor, a chipset, etc. In one embodiment, IC die 610 comprises an SoC having multiple functional units (e.g., one or more processing units, one or more graphics units, one or more communications units, one or more signal processing units, one or more security units, etc.). However, it should be understood that the disclosure is not limited to any particular type or class of IC device. If a PoP assembly is used it may comprise part of any type of computing system, as described below.

Energy storage devices as disclosed herein may be used as part of computing systems of various kinds. One example of such a computing system is the mobile electronic device described above. In that or other embodiments, the computing system may include a number of components disposed on a mainboard or other circuit board. The mainboard may include a first side and an opposing second side, and various components may be disposed on either one or both of the first and second sides. For example, the computing system may include an energy storage device such as disclosed herein disposed on the mainboard's first or second side. The system may comprise any type of computing system, such as, for example, a hand-held or mobile computing device (e.g., a cell phone, a smart phone, a mobile internet device, a music player, a tablet computer, a laptop computer, a nettop computer, etc.). However, the disclosed embodiments are not limited to hand-held and other mobile computing devices and these embodiments may find application in other types of computing systems, such as desk-top computers and servers.

The mainboard may comprise any suitable type of circuit board or other substrate capable of providing electrical communication between one or more of the various components disposed on the board. In one embodiment, for example, the mainboard comprises a printed circuit board (PCB) comprising multiple metal layers separated from one another by a layer of dielectric material and interconnected by electrically conductive vias. Any one or more of the metal layers may be formed in a desired circuit pattern to route—perhaps in conjunction with other metal layers—electrical signals between the components coupled with the board. However, it should be understood that the disclosed embodiments are not limited to the above-described PCB and, further, that the mainboard may comprise any other suitable substrate.

In addition to one or more energy storage devices, one or more additional components may be disposed on either one or both sides of the mainboard. Additional components that may be disposed on the mainboard include other IC devices (e.g., processing devices, memory devices, signal processing devices, wireless communication devices, graphics controllers and/or drivers, audio processors and/or controllers, etc.), power delivery components (e.g., a voltage regulator and/or other power management devices, a power supply such as a battery, and/or passive devices such as a capacitor), and one or more user interface devices (e.g., an audio input device, an audio output device, a keypad or other data entry device such as a touch screen display, and/or a graphics display, etc.), as well as any combination of these and/or other devices. In some embodiments the computing system may include one or more of a radiation shield, a cooling solution, an antenna, or the like. In some embodiments the computer system may be disposed within a housing or case. Where the mainboard is disposed within a housing, some of the components of the computer system—e.g., a user interface device, such as a display or keypad, and/or a power supply, such as a battery—may be electrically coupled with the mainboard (and/or a component disposed on this board) but may be mechanically coupled with the housing.

As an example, energy storage device 620 can be similar to energy storage device 500, a portion of which is shown in FIG. 5. Accordingly, energy storage device 620 is characterized by at least one of the following statements (the details of each of which have been discussed above): (1) the mobile electronic device further comprises a film on at least one of the first and second porous semiconducting structures, the film comprising a material capable of exhibiting reversible electron transfer reactions; (2) at least one of the first and second electrolytes contains a plurality of metal ions; and (3) the first and second electrolytes, taken together, comprise a redox system.

Figure 7:
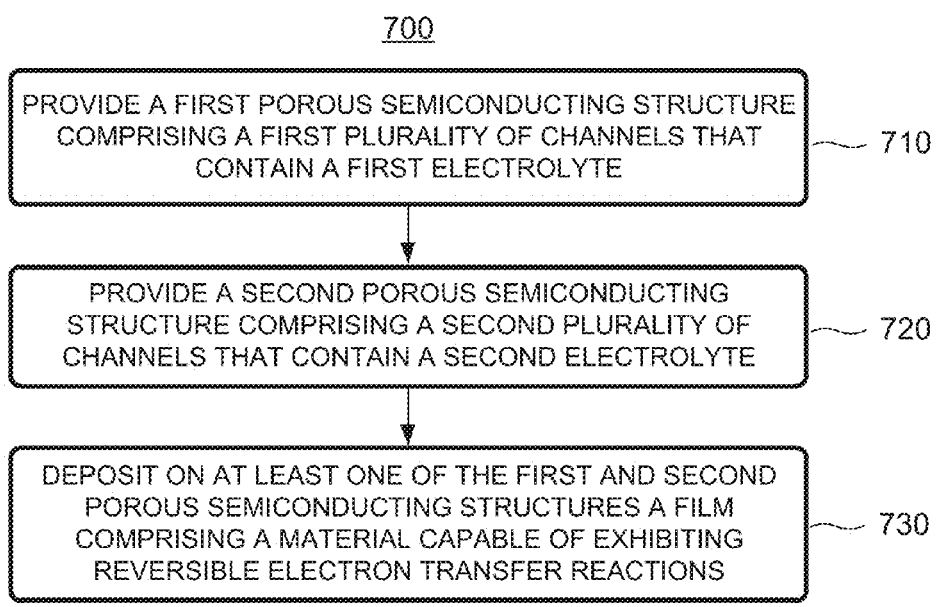
FIGS. 7 and 8 are flowcharts illustrating methods of manufacturing an energy storage device according to embodiments of the invention.

FIG. 7 is a flowchart illustrating a method 700 of manufacturing an energy storage device according to an embodiment of the invention. As an example, method 700 may result in the formation of an energy storage device similar to energy storage device 500, described above.

An operation 710 of method 700 is to provide a first porous semiconducting structure comprising a first plurality of channels that contain a first electrolyte. As an example, the first porous semiconducting structure can be similar to porous semiconducting structure 510 that is shown in FIG. 5.

An operation 720 of method 700 is to provide a second porous semiconducting structure comprising a second plurality of channels that contain a second electrolyte. As an example, the second porous semiconducting structure can be similar to porous semiconducting structure 520 that is shown in FIG. 5.

In certain embodiments, method 700 further comprises, either as part of operations 710 and 720 or as one or more separate operations, providing at least one of the first and second electrolytes with a plurality of metal ions and depositing a barrier layer on the at least one of the first and second porous semiconducting structures prior to depositing the film. In the same or other embodiments, the first and second electrolytes may be selected such that, taken together, they comprise a redox system. As an example, the barrier layer can be similar to passivation barrier layer 540 that is shown in FIG. 5 and the metal ions can be as described elsewhere herein. As has also been described, in some embodiments the barrier layer may be part of a bi-layer structure that also includes the film deposited in operation 730 as discussed below. In such cases, the barrier layer would be deposited onto (or otherwise applied to) the porous electrode first after which the pseudocapacitive film would be deposited or otherwise applied. As has been described above, in some embodiments depositing the barrier layer comprises using an ALD technique.

An operation 730 of method 700 is to deposit on at least one of the first and second porous semiconducting structures a film comprising a material capable of exhibiting reversible electron transfer reactions. In some embodiments, operation 730 comprises using an ALD technique. As an example, the film can be similar to film 535 that is shown in FIG. 5.

In a particular embodiment, the film comprises vanadium nitride (VN) and the ALD technique is performed using TDEAV and ammonia ($NH_3$) or a hydrazine (e.g., $N_2H_4$, methylhydrazine, dimethylhydrazine, tert-butylhydrazine) as precursors. In a different embodiment, the film comprises vanadium nitride and the ALD technique is performed using $VCl_4$ and $NH_3$ or a hydrazine as precursors. In yet another embodiment, the film comprises vanadium titanium nitride and the ALD technique is performed using $VCl_4$, $TiCl_4$, and $NH_3$ or a hydrazine as precursors. In still another embodiment, the film comprises $RuO_2$ and the ALD technique is performed using an organoruthenium compound (such as bis(ethylcyclopentadienyl)ruthenium) and oxygen as precursors.

Figure 8:
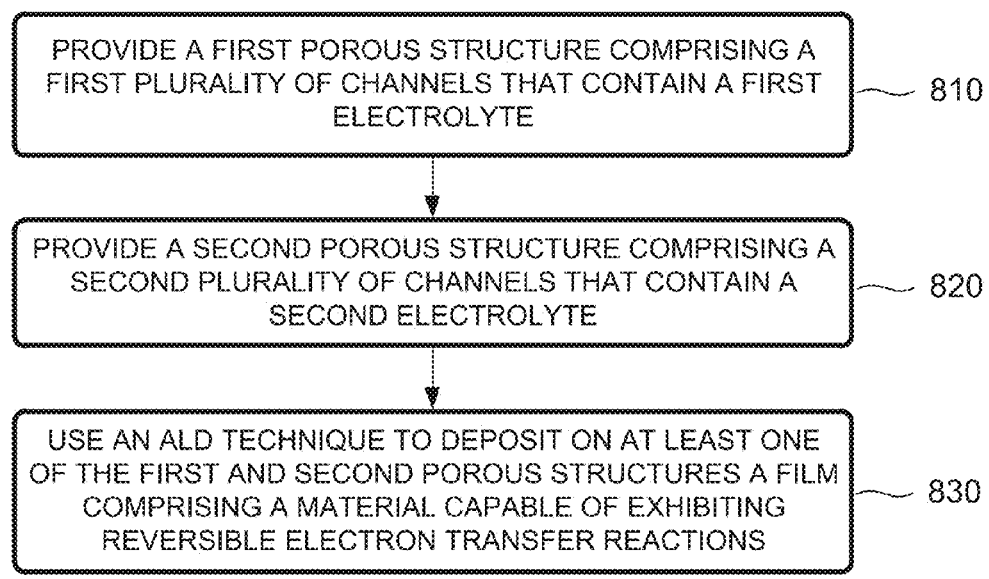

FIG. 8 is a flowchart illustrating a method 800 of manufacturing an energy storage device according to another embodiment of the invention. As is the case with method 700 above, method 800 may result in the formation of an energy storage device similar to energy storage device 500.

An operation 810 of method 800 is to provide a first porous structure comprising a first plurality of channels that contain a first electrolyte.

An operation 820 of method 800 is to provide a second porous structure comprising a second plurality of channels that contain a second electrolyte.

In certain embodiments, method 800 further comprises, either as part of operations 810 and 820 or as one or more separate operations, providing at least one of the first and second electrolytes with a plurality of metal ions and depositing a barrier layer on the at least one of the first and second porous semiconducting structures prior to depositing the film. In the same or other embodiments, the first and second electrolytes may be selected such that, taken together, they comprise a redox system. As an example, the barrier layer can be similar to passivation barrier layer 540 that is shown in FIG. 5 and the metal ions can be as described elsewhere herein. As has also been described, in some embodiments the barrier layer may be part of a bi-layer structure that also includes the film deposited in operation 830 as discussed below. In such cases, the barrier layer would be deposited onto (or otherwise applied to) the porous electrode first after which the pseudocapacitive film would be deposited or otherwise applied. As has been described above, in some embodiments depositing the barrier layer comprises using an ALD technique.

An operation 830 of method 800 is to use an ALD technique to deposit on at least one of the first and second porous structures a film comprising a material capable of exhibiting reversible electron transfer reactions. As an example, the film can be similar to film 535 that is shown in FIG. 5.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the energy storage device and the related structures and methods discussed herein may be implemented in a variety of embodiments, and that the foregoing discussion of certain of these embodiments does not necessarily represent a complete description of all possible embodiments.

Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. An energy storage device comprising:
a first porous semiconducting structure comprising a first plurality of channels that contain a first electrolyte;
a second porous semiconducting structure comprising a second plurality of channels that contain a second electrolyte, which is different from the first electrolyte; and
a film on at least one of the first and second porous semiconducting structures, the film comprising a material capable of exhibiting reversible electron transfer reactions;
wherein:
the first and second electrolytes, taken together, comprise a redox system.

2. The energy storage device of claim 1 wherein:
the first and second porous semiconducting structures are formed in a material selected from a group consisting of silicon, germanium, SiC, GaAs, and InP.

3. The energy storage device of claim 1 wherein:
the material is one that may be deposited by atomic layer deposition.

4. The energy storage device of claim 1 wherein:
the material is a conducting polymer.

5. The energy storage device of claim 1 wherein:
the material comprises a nitride, a carbide, an oxide, a silicide, a boride, a borosilicide, a phosphide, or a borophosphide.

6. The energy storage device of claim 5 wherein:
the nitride is a nitride of titanium, vanadium, niobium, tantalum, molybdenum, tungsten, chromium, vanadium-titanium, or titanium-aluminum;
the carbide is a carbide of titanium, zirconium, hafnium, vanadium, niobium, tantalum, molybdenum, or tungsten;
the silicide or borosilicide is of titanium, zirconium, hafnium, nickel, or cobalt;
the phosphide or borophosphide is of iron, ruthenium, cobalt, or nickel; and
the oxide is of ruthenium, lead, a carbon/transition metal composite, iridium, cobalt, manganese, molybdenum, and tungsten.

7. The energy storage device of claim 1 wherein:
at least one of the first and second electrolytes contains a plurality of metal ions; and
the energy storage device further comprises a barrier layer coating at least one of the first and second porous semiconducting structures.

8. The energy storage device of claim 7 wherein:
the barrier layer comprises one or more of TiN, ruthenium, tungsten, copper, and a high-k oxide.

9. An energy storage device comprising:
a first porous semiconducting structure comprising a first plurality of channels that contain a first electrolyte; and
a second porous semiconducting structure comprising a second plurality of channels that contain a second electrolyte, which is different from the first electrolyte, wherein at least one of the first and second electrolytes contains a plurality of metal ions; and
the first and second electrolytes, taken together, comprise a redox system.

10. The energy storage device of claim 9 wherein:
the first and second porous semiconducting structures are formed in a material selected from a group consisting of silicon, germanium, SiC, GaAs, and InP.

11. The energy storage device of claim 9 further comprising:
a barrier layer coating at least one of the first and second porous semiconducting structures.

12. The energy storage device of claim 11 wherein:
the barrier layer comprises one or more of TiN, ruthenium, tungsten, copper, and a high-k oxide.

13. An energy storage device comprising:
a first porous semiconducting structure comprising a first plurality of channels that contain a first electrolyte; and
a second porous semiconducting structure comprising a second plurality of channels that contain a second electrolyte, which is different from the first electrolyte, wherein the first and second electrolytes, taken together, comprise a redox system.

14. The energy storage device of claim 13 wherein:
the first and second porous semiconducting structures are formed in a material selected from a group consisting of silicon, germanium, SiC, GaAs, and InP.

15. The energy storage device of claim 13 wherein:
at least one of the first and second electrolytes contains a plurality of metal ions; and
the energy storage device further comprises a barrier layer coating at least one of the first and second porous semiconducting structures.

16. The energy storage device of claim 15 wherein:
the barrier layer comprises one or more of TiN, ruthenium, tungsten, copper, and a high-k oxide.

17. A mobile electronic device comprising:
a housing;
an integrated circuit die within the housing; and
an energy storage device within the housing and associated with the integrated circuit die so as to be capable of providing energy to the integrated circuit die, wherein the energy storage device comprises:
a first porous semiconducting structure comprising a first plurality of channels that contain a first electrolyte;
a second porous semiconducting structure comprising a second plurality of channels that contain a second electrolyte, which is different from the first electrolyte; and the first and second electrolytes, taken together, comprise a redox system; wherein
at least one of the following is true:
the mobile electronic device further comprises a film on at least one of the first and second porous semiconducting structures, the film comprising a material capable of exhibiting reversible electron transfer reactions; and
at least one of the first and second electrolytes contains a plurality of metal ions.

18. The mobile electronic device of claim 17 wherein:
the first and second porous semiconducting structures are formed in a material selected from a group consisting of silicon, germanium, SiC, GaAs, and InP.

19. A method of manufacturing an energy storage device, the method comprising:
providing a first porous semiconducting structure comprising a first plurality of channels that contain a first electrolyte;
providing a second porous semiconducting structure comprising a second plurality of channels that contain a second electrolyte, which is different from the first electrolyte;
depositing on at least one of the first and second porous semiconducting structures a film comprising a material capable of exhibiting reversible electron transfer reactions; and
selecting the first and second electrolytes such that, taken together, they comprise a redox system.

20. The method of claim 19 wherein:
providing the first porous semiconducting structure and providing the second porous semiconducting structure comprises providing first and second porous semiconducting structures formed in a material selected from a group consisting of silicon, germanium, SiC, GaAs, and InP.

21. The method of claim 19 further comprising:
providing at least one of the first and second electrolytes with a plurality of metal ions; and
depositing a barrier layer on the at least one of the first and second porous semiconducting structures prior to depositing the film.

22. The method of claim 21 wherein:
depositing the barrier layer comprises using an ALD technique.

23. A method of manufacturing an energy storage device, the method comprising:
providing a first porous structure comprising a first plurality of channels that contain a first electrolyte;
providing a second porous structure comprising a second plurality of channels that contain a second electrolyte, which is different from the first electrolyte;
using an ALD technique to deposit on at least one of the first and second porous structures a film comprising a material capable of exhibiting reversible electron transfer reactions; and
selecting the first and second electrolytes such that, taken together, they comprise a redox system.

24. The method of claim 23 wherein:
providing the first porous structure and providing the second porous structure comprises providing first and second porous structures formed in carbon.

25. The method of claim 23 further comprising:
providing at least one of the first and second electrolytes with a plurality of metal ions; and
depositing a barrier layer on the at least one of the first and second porous structures prior to depositing the film.

26. The method of claim 25 wherein:
depositing the barrier layer comprises using an ALD technique.

* * * * *